3,387,041
PROCESS FOR PREPARING DINITRODIPHENYL ETHERS
John A. Oscar, Wilmington, Del., assignor to E. I. du Pont de Nemours and Company, Wilmington, Del., a corporation of Delaware
No Drawing. Continuation-in-part of application Ser. No. 224,497, Sept. 18, 1962. This application Apr. 6, 1967, Ser. No. 628,851
9 Claims. (Cl. 260—612)

ABSTRACT OF THE DISCLOSURE

The preparation of dinitrodiphenyl ethers from substantially anhydrous alkali-metal nitrophenolates and halomononitrobenzenes in the presence of selected amides. Yields are improved by the use of the selected amide solvent and by the use of anhydrous reactants.

CROSS-REFERENCES TO RELATED APPLICATIONS

This application is a continuation-in-part of application Ser. No. 224,497 filed Sept. 18, 1962 and now abandoned.

BACKGROUND OF THE INVENTION

(1) Field of the invention

This invention relates to the preparation of dinitrodiphenyl ethers from substantially anhydrous alkali-metal nitrophenolates and selected halomononitrobenzenes in the presence of selected amides.

(2) Description of the prior art

Dinitrodiphenyl ethers have been prepared from alkali-metal nitrophenolates and selected halomononitrobenzenes. However, the yields obtained were low until the work by Spiegler in U.S. Patent 3,192,263 who showed that the yield could be improved by employing a solvent medium of a selected N,N-disubstituted aliphatic amide; and by Towle in U.S. Patent 3,032,594 who showed the yield could be improved by using a solvent medium of dimethyl sulfoxide. Spiegler stated that dimethyl formamide was not suitable for use; while Towle disclosed poor yields in his process when employing dimethyl formamide. Thus a solvent medium of dimethyl formamide or some related amides was impractical in the process because of resulting low yields. Such impracticality has been removed by this invention.

SUMMARY OF THE INVENTION

It has now been found that dinitrodiphenyl ethers are produced in high yield from a substantially anhydrous mixture of an alkali-metal nitrophenolate and a halomononitrobenzene at a temperature of between 150–250° C. in the presence of a solvent selected from the class consisting of N-methylformamide, N,N-dimethylformamide, and carboxamides of the formula R—CONHR$^1$ wherein R is alkyl of 1 through 4 carbon atoms, R$^1$ is hydrogen or alkyl of 1 through 3 carbon atoms and wherein the total number of carbon atoms in R and R$^1$ does not exceed five; provided the reaction is carried out under substantially anhydrous conditions. By the term "substantially anhydrous conditions" is meant that the reaction mixture, including reactants and solvent, contains no more than 0.5 percent total water, based on the weight of the reaction mixture. Under this definition it is necessary that the alkali-metal nitrophenolate be dehydrated prior to use in the process.

DESCRIPTION OF THE INVENTION

As summarized above, the present invention comprises an improved process whereby one starts with essentially dry reactants and employs solvent medium which heretofore were not used because of the poor yields obtained.

Any substituted derivative of an alkali-metal nitrophenolate and a halomononitrobenzene can be employed as reactants provided the substituents are not of ionic or salt-forming substituents such as OH, COOH, SO$_3$H or NH$_2$.

Thus the halomononitrobenzene may be a compound of the formula

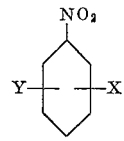

wherein X stands for halogen such as Cl or Br and is located in a position ortho or para to the NO$_2$ group and Y is hydrogen, lower alkyl, lower alkoxy or a halogen atom located meta to the NO$_2$ group. The mononitrophenolate may be a compound of the formula

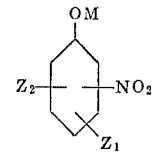

wherein M is an alkali-metal such as sodium, potassium or lithium while $Z_1$ and $Z_2$ are each members of the group consisting of hydrogen, lower alkyl, lower alkoxy and halogen which is oriented meta with respect to the NO$_2$ group. Preferably M is sodium or potassium.

As specific illustrations of practical initial reactants that may be chosen for the improved process of my invention may be mentioned:

(A) Halonitrobenzenes.—o - Chloronitrobenzene, p-chloronitrobenzene, 2,5-, 2,3- and 3,4-dichloronitrobenzene, 4-chloro-3-nitro-toluene, and o- or p-chloronitrobenzenes containing a methyl group in any other position, 2 - chloro-5-ethylnitrobenzene, 4-chloro-2,5-dimethylnitrobenzene, 5-chloro-2-nitroanisole and 4-chloro-3-nitrophenetol. The corresponding bromonitrobenzenes are also operative but are naturally more expensive.

(B) Alkali-metal nitrophenolates.—The sodium or potassium salt of any of the following phenols: o-, m- or p-nitrophenol, 4-methyl-3-nitrophenol, 2-methyl-5-nitrophenol, 4-chloro-2-nitrophenol, 2,6-dichloro-4 - nitrophenol, the corresponding bromo or dibromo-nitrophenols, 4-ethyl-3-nitrophenol, 2-ethyl-5-nitrophenol, 2-nitro-6 - methoxyphenol, 2-nitro-3-hydroxy-5-methoxytoluene, 2,5-dimethyl-4-nitrophenol, 4,5-dimethyl-2-nitrophenol, 4-ethyl-2-nitrophenol, a mixture of 2-ethyl-4-nitrophenol and 2-ethyl-6-nitrophenol, and in general any nitrophenol containing one or more lower alkyl or alkoxy substituents in any position or containing chlorine or bromine in a position meta to the nitro group.

The amount of the previously defined solvent employed is not critical; however, it should be sufficient to produce a stirrable suspension at the condensation temperature, bearing in mind the formation of solid alkali-metal halide in the course of the reaction. As a rule, a quantity of the solvent equal in weight to the sum of the initial reactants, will suffice. Quantities twice or three times this amount may be employed, but are unnecessary. A preferred, but not critical, quantity of solvent employed is that amount equal in weight to from 1.5 to 2.5 times the weight of the halonitrobenzene reactant.

In addition to the N-methylformamide, and N,N-dimethylformamide solvents, the previously defined carboxamides are useful as solvents in the process of this invention. Examples of such carboxamides include acetamides, N-methylacetamide, N-ethylacetamide, N-propylacetamide, propionamide, N-methylpropionamide, N-ethylpropionamide, butyramide, N-methylbutyramide and the like.

The above-mentioned solvents are liquids having boiling points ranging from about 153° C. to 225° C.

The halomononitrobenzenes are usually obtained in essentially anhydrous condition, and the selected solvents employed are obtainable commercially with anhydrous specifications. Thus, only the alkali-metal nitrophenolate need be dehydrated prior to use in the process. Dehydration may be effected by careful oven drying, e.g., at 90° to 95° C. under an absolute pressure of 50 to 75 mm. of Hg (it will be noted that alkali-metal nitrophenolates constitute an explosion hazard); or by refluxing a suspension of the same in a non-polar solvent such as toluene or xylene with separation of water from the distillate while recirculating the solvent; or by distilling a suspension or solution of the same in the carboxamide solvent until the solution of alkali-metal nitrophenolate is essentially free of water.

Temperature is not critical, but the reaction is ordinarily carried out under reflux conditions at atmospheric pressures. Nor is time of reaction critical. The speed of the condensation reaction depends in general upon the solvent employed. Amounts of reactants employed are not critical either, but it is preferred to carry out the reaction in equimolar proportions.

Isolation of the dinitrodiphenyl ether may be achieved in any convenient manner, for instance by diluting the reaction mass with sufficient water to dissolve the by-product alkali-metal salt, and filtering off the precipitated dinitro-ether, or by distillation of the solvent followed, preferably, by drowning with water.

Without limiting this invention, the following representative examples are given to illustrate my preferred mode of operation. Parts mentioned are by weight.

EXAMPLE 1

A mixture of 87 parts of oven-dried p-nitrophenol sodium salt, 79 parts of p-chloronitrobenzene and 264 parts of an anhydrous grade of commercial dimethylformamide was refluxed for 6 hours at 151°–155° C. The reaction mass was drowned in 1000 parts of water, stirred for 1 hour and filtered. The filtered cake was slurried twice with 500 parts of water and the precipitate washed again with 1000 parts water. The product was air dried at 100° C. The 4,4'-dinitrodiphenyl thus obtained melted at 140.8–141.8° C.

If desired, the drowning step may be omitted. Instead, the hot reaction mass is filtered to remove sodium chloride, and cooled to crystallize out the product.

EXAMPLE 2

A reaction vessel, equipped with a reflux condenser attached to a water cooled distilling tube receiver (for separation of water from distillate and returning lighter than water hydrocarbon layer to the reaction vessel) was charged with 115 parts of technical p-nitro sodium phenolate and 250 parts of toluene. The mixture was stirred and distilled at constant volume for 3–4 hours. The water in the distillate was separated, and the toluene layer returned to the reaction flask. 30 parts of water were removed.

After free water was no longer present, distillation was continued (without return to the flask) until 135—140 parts of toluene were distilled out. (Dehydration can also be effected by adding 700 parts of toluene (or xylene) and distilling out 600 parts of the solvent while entraining the 30 parts of water.)

The yellow hydrated sodium salt of the nitrophenol changed to bright red, and considerable quantities of the product were "caked" onto the sides of the reaction flask above the liquid level.

The final conditions attained after dehydration were an oil-bath temperature of 165±2° C., and a pot temperature of 110.5±0.2° C.

79 parts of p-nitrochlorobenzene and 264 parts of N-methylacetamide were added to the thick red colored suspension of dehydrated p-nitrophenol sodium salt crystals. Toluene (200–150 parts containing 2–3% of N-methylacetamide) was then removed by distilling through a short packed column until a pot temperature of 185±2° C. was reached. The reaction mass was refluxed at 185±2° C. for 6 hours to complete the condensation. During this period, the red colored p-nitrophenol sodium salt (which was "caked" onto the sides of the flask during the dehydration) dissolved in the solvent, and was completely reacted. The reaction mass was allowed to cool to room temperature and held one hour while stirring. The pale yellow precipitate was collected by filtration on a Büchner funnel and washed by displacement on the filter with three 30-part portions of toluene (recovered from the dehydration and condensation steps). These washes (100–120 parts, analyzing 7–9% 4,4'-dinitrodiphenyl ether and 15–20% N-methylacetamide) and the N-methylacetamide reaction filtrates (300–380 parts, analyzing 23–25% 4,4'-dinitrodiphenyl ether and 1–1.5% p-nitrochlorobenzene) were combined for re-use in subsequent recycles. The filter press cakes of salt (NaCl and 4,4'-dinitrodiphenyl ether) was slurried in 6–8 volumes of water (based to a pH of 8–9 with 1–2 drops of 30% NaOH) and refiltered. The yellow colored aqueous filtrate containing sodium chloride and trace amounts of p-nitrophenol sodium salt was discarded. The 4,4'-dinitrodiphenyl ether precipitate was finally washed free of chlorides and alkali with 500 parts of water and dried in air to constant weight at 100° C.

The N-methylacetamide and toluene filtrates may be combined and vacuum distilled to recover the solvents. A small residue remaining may also be recrystallized to give a further quantity of good quality 4,4'-dinitrodiphenyl ether. However, it was found that the solvent mixture need not be fractionated, but could be re-used in the condensation as such.

EXAMPLE 3

103 grams of the sodium salt of p-nitrophenol (containing water of hydration (were placed in a 4-neck round-bottom 500 ml. flask fitted with a mechanical stirrer, a thermometer, a Vigeraux column and a conventional distillation head. 180 ml. of dimethylformamide were charged and the mixture heated to reflux (about 134° C.) with stirring. The entrained water was removed through the column distillation head assembly and collected in a receiver until the reflux temperature reached 167° C. Forty ml. of distillate containing water and dimethylformamide was obtained. The system was cooled to 80° C. and 78.8 grams of p-nitrochlorobenzene added with stirring while heating to a reflux temperature of 175° C. The system was refluxed for 10 hours during which time sodium chloride precipitated out and the reflux temperature decreased from 175° C. to 165° C. The reaction mixture was then cooled to 80° C. and poured into 500 ml. of water at such a rate to maintain the temperature of the water at 25–30° C. 5 ml. of 30% caustic was added, the mixture agitated for 30 minutes, and then filtered on a Buchner funnel. The dark yellow crystals were water washed until the filtrate was alkaline-free on brilliant yellow paper. The crystals were then oven-dried at 80° C. under 25 inches of mercury. The yield was 121 grams (93%) with a melting point of 137–139° C.

EXAMPLE 4

Example 1 was repeated except that the oven-dried potassium salt of p-nitrophenol was employed in place of the sodium salt of p-nitrophenol. The reflux temperature was 147–150° C. and a yield of about 84.5% obtained. The product melted at about 142.8° C.

EXAMPLE 5

Example 1 was repeated using the oven-dried lithium salt of p-nitrophenol in place of the sodium salt. The reflux temperature was 166–167° C. and the yield obtained was about 65.1%. The product melted at about 142.6° C.

EXAMPLE 6

63 grams of the wet potassium salt of p-nitrophenol (74.3% weight due to the potassium salt) was dried by the distillation procedure of Example 3 except that the distillation temperature reached 130° C. at 350 mm. pressure. After cooling to 80° C., p-nitrochlorobenzene and dimethylformamide were added in ratios given in Example 1 followed thereafter. Yield obtained was 88.8% and the product had a melting point of about 143.6° C.

EXAMPLE 7

The procedure of Example 6 was repeated except that 51 grams of the wet lithium salt of p-nitrophenol (75.4% weight due to the lithium salt) was employed in place of the wet potassium salt. The yield was 63.5% and the product had a melting point of about 140.7° C.

The following table lists additional representative solvents applicable in the invention, and the yields of 4,4'-dinitrodiphenyl ether obtained in the respective reaction medium by the procedure of Example 1.

| Solvent | Reaction Condition | | 4,4'-dinitrodiphenyl Ether Yield, percent | |
|---|---|---|---|---|
| | Temp., °C. | Time, Hrs. | M.P. °C. | Isolated [1] | Total Analyzed |
| Dimethylformamide | 153 | 6 | 140.8–141.8 | 76 | 80 |
| Acetamide | 165 | 6 | 144 –144.7 | [2] 41.5 | 81 |
| N-methylacetamide | 185 | 6 | 142.6–143.4 | [3] 74 | 92+ |

[1] Isolated by drowning in water, unless otherwise indicated.
[2] Precipitated after drowning in water, extracted with benzene to separate unreacted p-chloronitrobenzene (10–12%).
[3] Crystallized from condensation mass.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments disclosed herein.

The embodiments of the invention in which an exclusive property or privilege is claimed are defined as follows:

1. A process for producing a dinitrodiphenyl ether which comprises reacting, under substantially anhydrous conditions, a substantially anhydrous alkali-metal nitrophenolate with a halogeno-mononitrobenzene having a halogen atom in a position other than meta to the nitro group, in a water-miscible aliphatic amide of the group consisting of N - methylformamide, N,N-dimethylformamide and carboxamides of the formula R—CONHR', where R is an alkyl of 1–4 carbon atoms, R' is hydrogen or alkyl of 1–3 carbon atoms and the total number of carbon atoms in R and R' does not exceed 5; said process being carried out in the presence of no more than 0.5 percent total water, based on the weight of the reaction mixture.

2. The process of claim 1, wherein the quantity of said solvent employed is sufficient to form a fluid melt with the reactants and the reaction is carried out at the reflux temperature of said melt.

3. The process of claim 1 wherein the halogeno-mononitrobenzene is of the formula

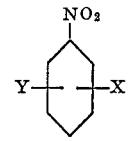

and the alkali-metal nitrophenolate is of the formula

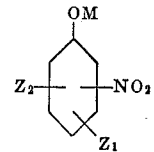

wherein M is an alkali metal; X is chlorine or fluorine located in a position other than meta to the NO₂ group; Y, $Z_1$ and $Z_2$ are each hydrogen, alkyl, alkoxy or meta-oriented halogen, said alkyl and alkoxy of 1–4 carbon atoms and said orientation being taken with respect to the NO₂ group; the reaction being carried out at a temperature of between about 150° to 250° C.

4. The process of claim 3 wherein the amide is N-methylformamide.

5. The process of claim 3 wherein the amide is N,N'-dimethylformamide.

6. The process of claim 3 wherein the amide is a carboxamide of the formula R—CONH₂ wherein R is alkyl of 1 to 4 carbon atoms.

7. The process of claim 3 wherein the amide is a carboxamide of the formula R—CONH—R' where R and R' are defined as in claim 3.

8. The process of claim 3 wherein the alkali-metal nitrophenolate is the sodium salt of p-nitrophenol and the halogeno-mononitrobenzene is p-chloronitrobenzene.

9. The process of claim 3 wherein the alkali-metal nitrophenolate is the potassium salt of p-nitrophenol and the halogeno-mononitrobenzene is p-chloronitrobenzene.

References Cited

UNITED STATES PATENTS 3,032,594   5/1962   Towle _____ 260—612
3,192,263   6/1965   Spiegler _____ 260—571

BERNARD HELFIN, Primary Examiner.